(12) United States Patent
Huang

(10) Patent No.: US 7,486,358 B2
(45) Date of Patent: Feb. 3, 2009

(54) MANUFACTURING PROCESS FOR ENHANCING LIGHT REFLECTION RATE IN A REFLECTIVE DISPLAY DEVICE

(75) Inventor: Shun-Tai Huang, Tainan County (TW)

(73) Assignee: Himax Display, Inc., Tainan County (TW)

( * ) Notice: Subject to any disclaimer, the term of this patent is extended or adjusted under 35 U.S.C. 154(b) by 301 days.

(21) Appl. No.: 11/454,723

(22) Filed: Jun. 16, 2006

(65) Prior Publication Data
US 2007/0291201 A1    Dec. 20, 2007

(51) Int. Cl.
G02F 1/1335 (2006.01)
G02B 5/08 (2006.01)
G02B 5/10 (2006.01)
G02B 7/182 (2006.01)

(52) U.S. Cl. .................. 349/113; 349/67; 359/459; 359/850; 359/871; 359/883

(58) Field of Classification Search ............ 349/67, 349/113–115; 359/459, 534, 850, 871, 883
See application file for complete search history.

(56) References Cited

U.S. PATENT DOCUMENTS

| | | | | |
|---|---|---|---|---|
| 4,106,859 | A * | 8/1978 | Doriguzzi et al. | 349/113 |
| 6,429,919 | B1 * | 8/2002 | Takatsuka et al. | 349/113 |
| 6,473,145 | B1 * | 10/2002 | Shim et al. | 349/113 |
| 6,501,522 | B2 * | 12/2002 | Chang et al. | 349/113 |
| 6,509,943 | B2 * | 1/2003 | Baek et al. | 349/113 |
| 6,806,928 | B2 * | 10/2004 | Nagayama | 349/113 |
| 6,856,366 | B2 * | 2/2005 | Matsushita et al. | 349/113 |
| 7,123,324 | B2 * | 10/2006 | Yoshii et al. | 349/113 |

FOREIGN PATENT DOCUMENTS

JP          2000089217 A  *  3/2000

* cited by examiner

Primary Examiner—Michelle R Connelly Cushwa
(74) Attorney, Agent, or Firm—J.C. Patents

(57) ABSTRACT

A manufacturing process for enhancing a light reflective rate in a reflective type display device is provided. The manufacturing process comprises steps of: forming a first conductive layer and a first dielectric layer over a substrate; etching the first dielectric layer; polishing the etched first dielectric layer; forming a second conductive layer over the substrate; and patterning the second conductive layer to form a concave mirror on the surface of the second conductive layer.

7 Claims, 4 Drawing Sheets

US 7,486,358 B2

MANUFACTURING PROCESS FOR ENHANCING LIGHT REFLECTION RATE IN A REFLECTIVE DISPLAY DEVICE

BACKGROUND OF THE INVENTION

1. Field of Invention

The present invention relates to a manufacturing process for enhancing light reflective rate in a reflective type display device.

2. Description of Related Art

Display devices are becoming slimmer, lighter and have a large screen. Especially, a large screen display device is an ongoing subject in current display technologies. Projection TVs are typical examples of the large screen display device.

Projection TVs are largely classified into CRT (Cathode Ray Tube) projection TVs and LCD (Liquid Crystal Display) projection TVs. The LCD projection TVs are classified into transmissive LCD-based systems or reflective LCD-based systems.

In the reflective LCD-based systems, a particular type of reflective LCD panel known as a liquid crystal on silicon (LCOS) display panel is used. The LCOS display panel uses reflective LCD elements arranged on a silicon backplane. LCOS display panels can be used in both single-panel and three-panel configurations, and are becomingly increasingly popular for use in applications such as compact projectors and head-up or near-to-eye projection display systems. LCOS display panels have a number of significant advantages over other types of reflective LCD panels. For example, crystalline silicon can be used to form active matrix elements of the LCOS panels. The silicon backplane can also be used to form the TFT drivers, timing controller and other functional circuitry, using well-known and efficient semiconductor manufacturing techniques. Moreover, a larger percentage of the active area can be used for processing video information for display.

In a reflective LCOS system, light reflection rate is a key factor to improve brightness of the system. During the prior manufacturing process of the LCOS display panel, a top metal layer is flat. However, the flat top metal layer may have some disadvantages concerning light reflection rate. Now please refer to FIG. 1 which shows light reflection in a reflective LCOS system. To be within the detection range for being detected by front side detection configuration (not shown), an incident light beam 101 should have an incident angle perceivable by the detection range, so after reflection, the reflected light beam 101 will be detected without light loss. If an incident light beam 103 has an incident angle non-perceivable by the detection range, after reflection, the reflected light beam 103 will not be detected, i.e. there is light loss.

There is a need to enhance the light reflection rate to approach high brightness requirement in the reflective LCOS system.

SUMMARY OF THE INVENTION

One of the aspects of the invention is to provide a manufacturing process for enhancing light reflective rate in a reflective type display device. A top metal layer has concave mirrors and it can change light reflection to move forward and be detected by front side detection configuration for enhancing light reflection rate effectively. In order to achieve the above and other aspects of the invention, the invention provides a manufacturing process for enhancing a light reflective rate in a reflective type display device is provided. The manufacturing process comprises steps of: forming a first conductive layer and a first dielectric layer over a substrate; etching the first dielectric layer; polishing the etched first dielectric layer; forming a second conductive layer over the substrate; and patterning the second conductive layer to form a concave mirror on the surface of the second conductive layer.

It is to be understood that both the foregoing general description and the following detailed description are exemplary, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE PREFERRED EMBODIMENTS

Figure 1:
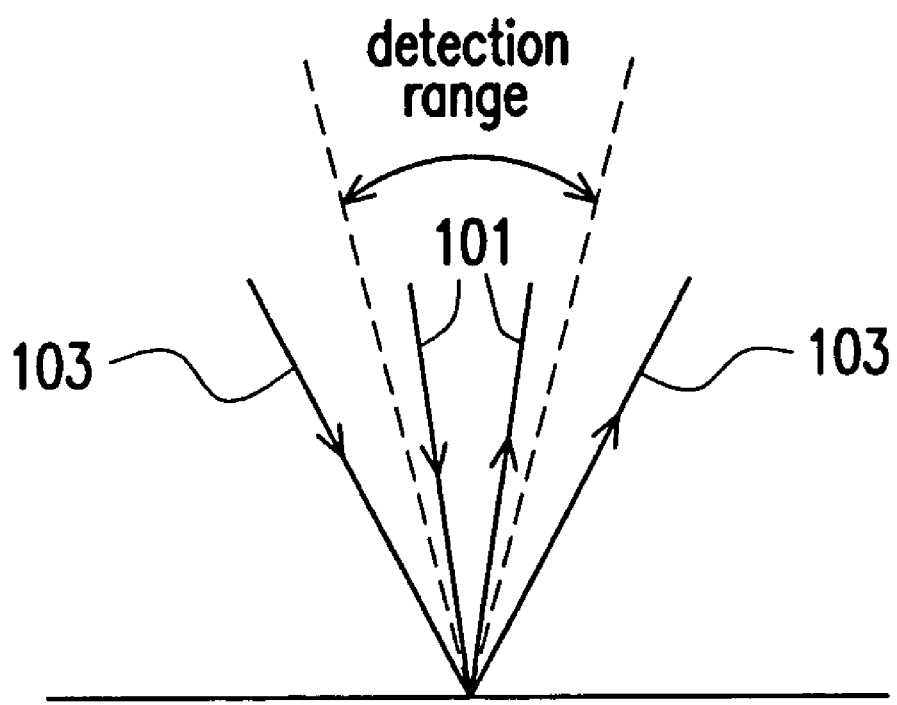
FIG. 1 shows light reflection in a prior reflective LCOS system.

Reference will now be made in detail to the present preferred embodiments of the invention, examples of which are illustrated in the accompanying drawings. Wherever possible, the same reference numbers are used in the drawings and the description to refer to the same or like parts.

In order to enhance light reflection rate, in an embodiment of the invention, a top metal layer has concave mirrors and it can change light reflection to move forward and be detected by front side detection configuration. This can enhance light reflection rate effectively.

FIGS. 2a~2e show a manufacturing process for enhancing light reflection rate in a reflective LCOS system according to an embodiment of the invention. In FIGS. 2a~2e, three metal layers and two inter-metal dielectric layers are shown for example, but the invention is not limited thereby.

Figure 2A:
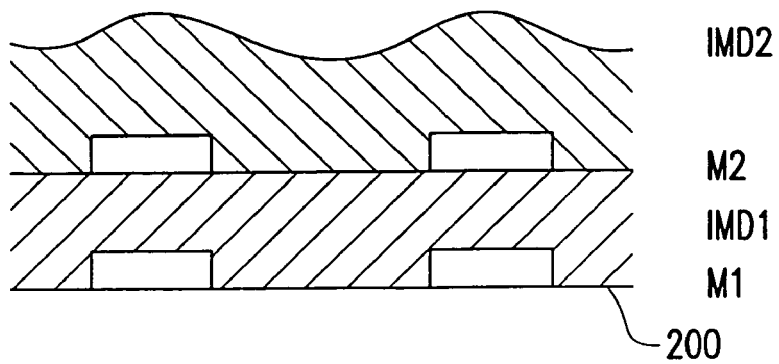
FIGS. 2a~2e show a manufacturing process for enhancing light reflection rate in a reflective LCOS system according to an embodiment of the invention.

Now please refer to FIG. 2a, in the manufacturing process for enhancing a light reflective rate in the reflective type display device, a first metal layer MI, a first inter-metal dielectric layer IMD1, a second metal layer M2 and a second inter-metal dielectric layer IMD2 are sequentially formed over a substrate 200. The formation of the layers M1, IMD1, M2 and IMD2 are not specially limited here.

Figure 2B:
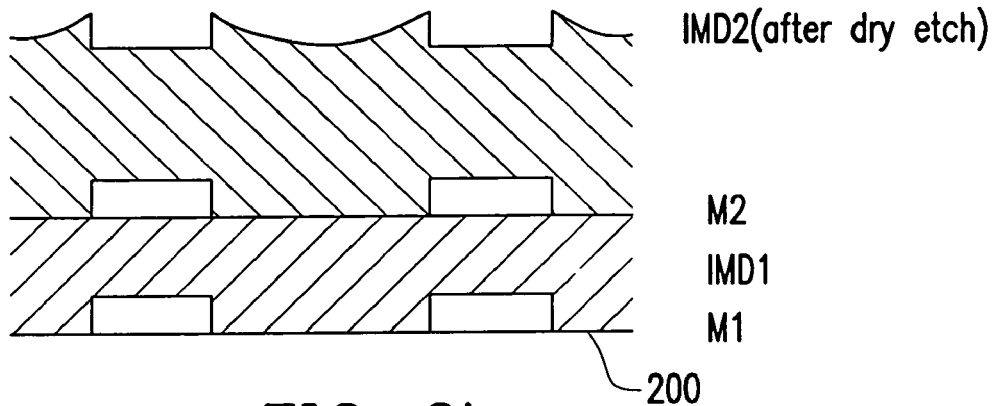

Now please refer to FIG. 2b, a photolithography process is used for defining the pattern of the second inter-metal dielectric layer IMD2. The second inter-metal dielectric layer IMD2 is etched under a photomask (not shown), for example in a depth of 2000 angstroms. The etching process can be dry-etch or wet-etch process.

Figure 2C:
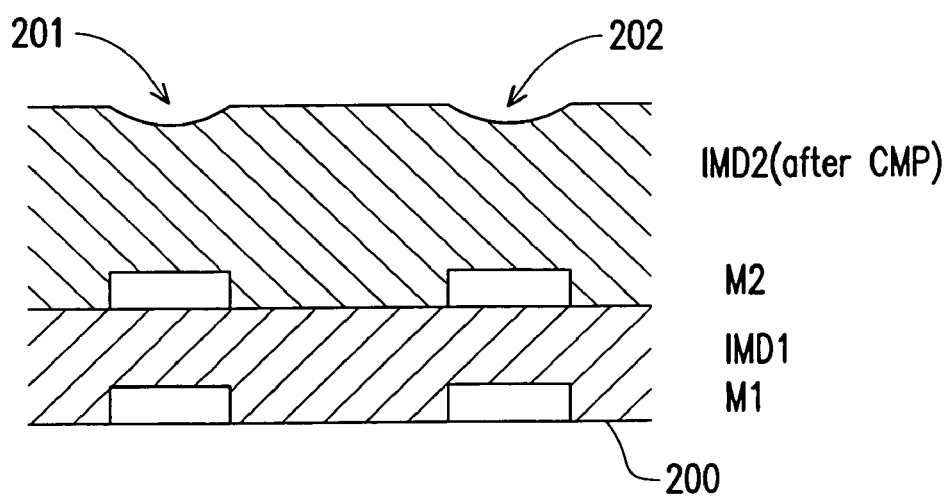

Now, please refer to FIG. 2c, after etching process, the second inter-metal dielectric layer IMD2 is polished by, for example but not limited to, CMP (Chemical Mechanical Polishing). After CMP, there are concaves 201 and 202 formed in the second inter-metal dielectric layer IMD2. Each of the concaves 201 and 202 has a dimension smaller than a pixel cell of the reflective LCOS system.

Figure 2D:
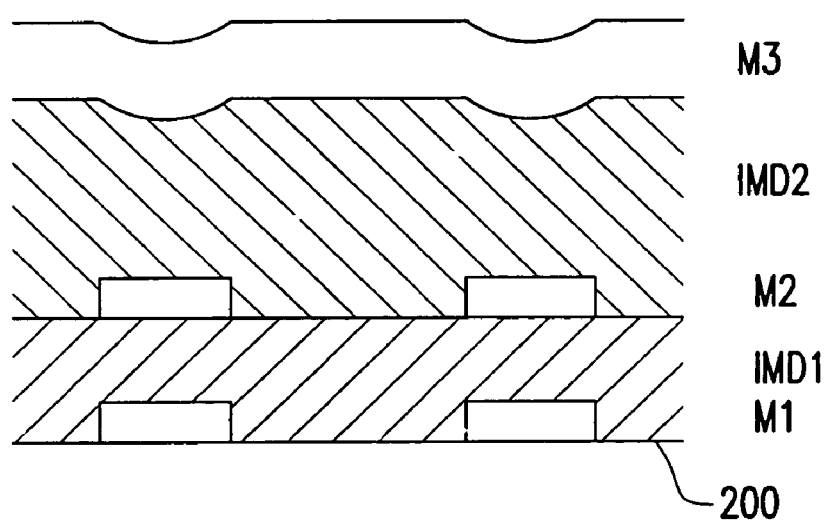

Now, please refer to FIG. 2d, after etching and polishing the second inter-metal dielectric layer IMD2, a third metal layer M3 is deposited over the substrate 200. The deposition of the third metal layer M3 is, for example but not limited to, by sputter.

Figure 2E:
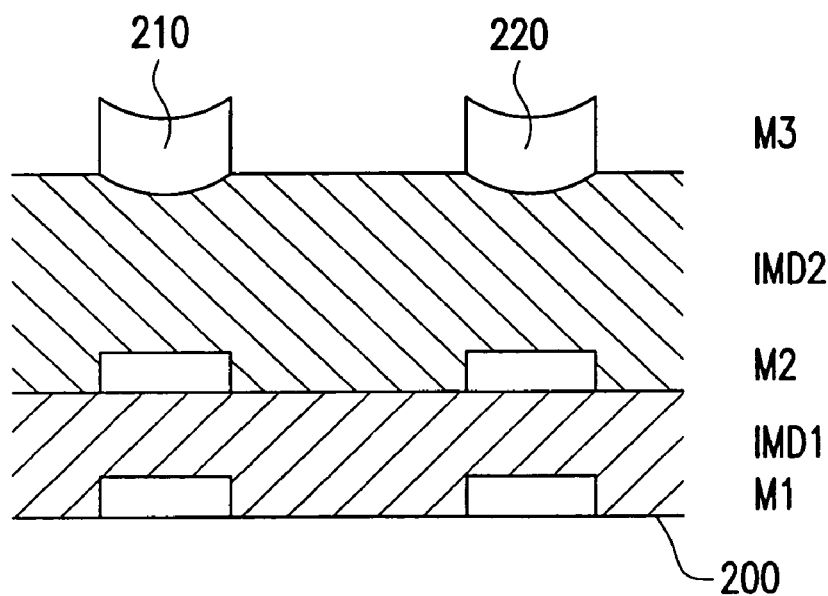

Now, please refer to FIG. 2e, a photolithography process is used for defining the pattern of the third metal layer M3. Then, the third metal layer M3 is etched to form concave mirrors 210 and 220 on the surface of the third metal layer M3. Shapes of the concave mirrors 210 and 220 are corresponded to the dimension of the concaves 201 and 202. As stated above, each of the concave mirrors 210 and 220 has a dimension smaller than the pixel cell of the reflective LCOS system, and accordingly the light reflection rate is enhanced.

Figure 3:
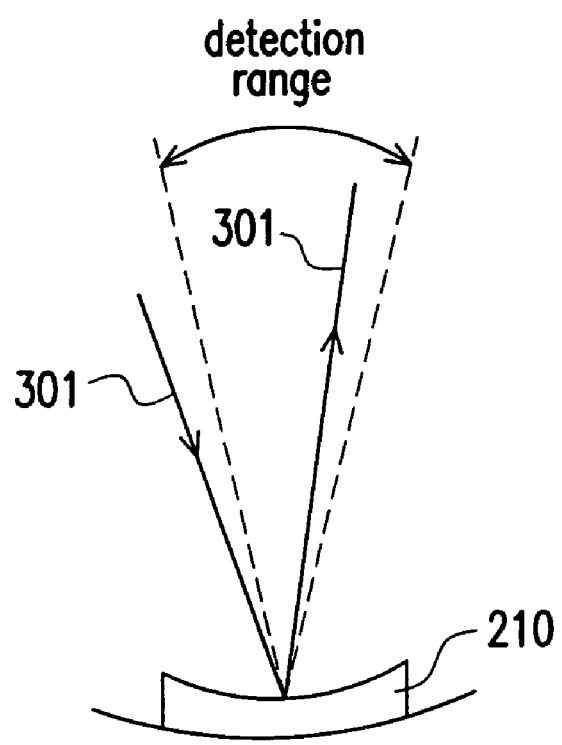
FIG. 3 shows light reflection in the reflective LCOS system according to the embodiment of the invention.

FIG. 3 shows light reflection in the reflective LCOS system according to the embodiment of the invention.

As shown in FIG. 3, although the incident light beam 301 has a large incident angle, due to the function of the concave mirror 210, the reflected light beam 301 is still fallen in the detection range. In other words, even by the same detection range, in the embodiment, a light beam with a large incidence angle still can be detected and the light reflection rate is enhanced by the top metal layer having concave mirrors.

It will be apparent to those skilled in the art that various modifications and variations can be made to the structure of the present invention without departing from the scope or spirit of the invention. In view of the foregoing descriptions, it is intended that the present invention covers modifications and variations of this invention if they fall within the scope of the following claims and their equivalents.

What is claimed is:

1. A manufacturing process for enhancing a light reflective rate in a reflective type display device, the manufacturing process comprising steps of:

forming a first conductive layer and a first dielectric layer over a substrate;

etching the first dielectric layer by a depth smaller than the thickness of the first dielectric layer;

polishing the etched first dielectric layer;

forming a second conductive layer over the substrate; and patterning the second conductive layer to form a concave mirror on the surface of the second conductive layer.

2. The manufacturing process of claim 1, wherein after the polishing step, the first dielectric layer has a concave formed thereon.

3. The manufacturing process of claim 2, wherein the concave has a dimension smaller than a pixel cell of the reflective type display device.

4. The manufacturing process of claim 1, further comprising a step of forming a third conductive layer and a third dielectric layer over the substrate before the step of forming the first conductive layer.

5. The manufacturing process of claim 1, wherein a dry-etch process is performed in the step of etching the first dielectric layer.

6. The manufacturing process of claim 1, wherein the step of polishing the first dielectric layer includes a step of polishing the etched first dielectric layer by CMP.

7. The manufacturing process of claim 1, wherein the concave mirror on the surface of the second conductive layer has a dimension smaller than a pixel cell of the reflective type display device.

* * * * *